Patented June 28, 1927.

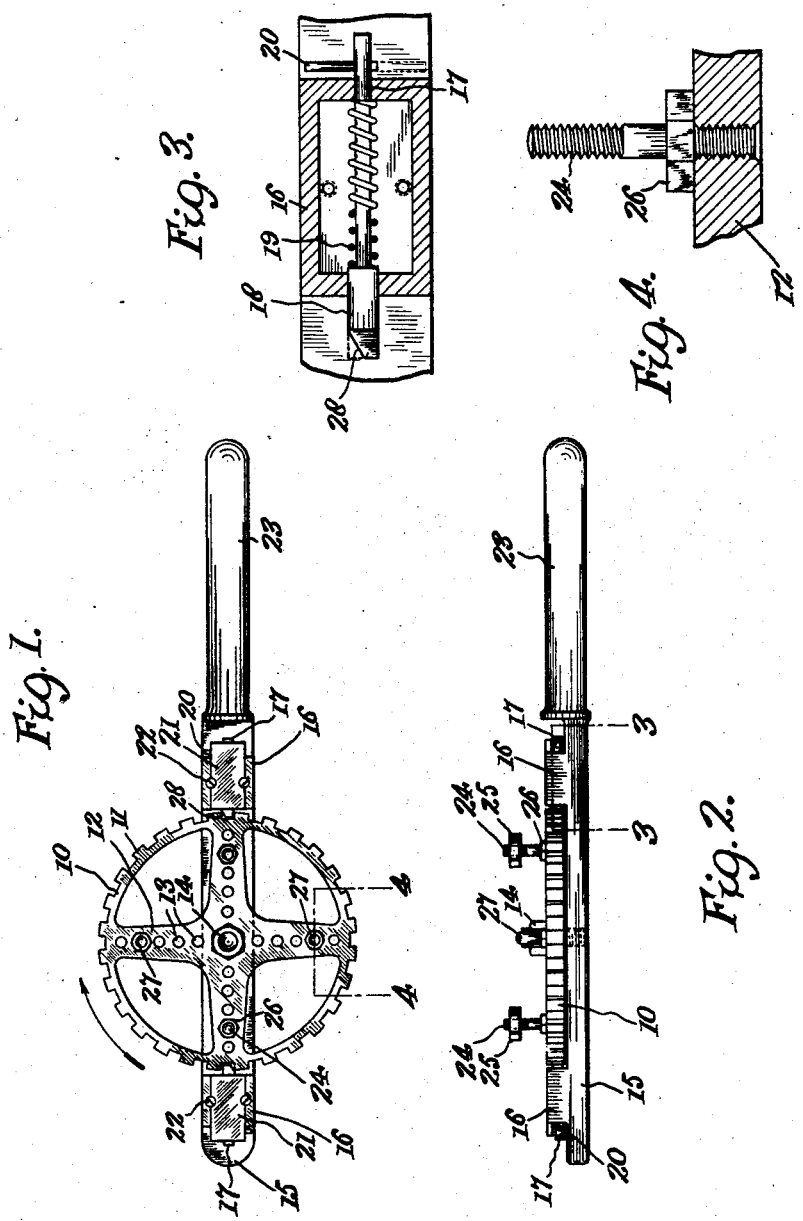

1,633,819

UNITED STATES PATENT OFFICE.

HENRY N. LONG, OF ROANOKE, VIRGINIA, ASSIGNOR TO WALTER K. QUEEN, OF NEEDHAM HEIGHTS, MASSACHUSETTS.

RATCHET FLANGE SETTER.

Application filed February 8, 1926. Serial No. 86,960.

The present invention relates to flange setters, and more particularly to a device for use in connection with pipes and flanges of large diameter.

An object of the present invention is to provide a flange setter of this type which may be operated on a ratchet principle and which may be adjusted for operation in either direction for taking care of right and left hand threads and also for positioning and removing the flanges.

Another object of the invention is to provide a flange setter of this type which comprises a rotatable member and means on the member for centering the flange and for binding the flange to the member for rotation therewith.

Another object of the invention is to provide a reciprocating handle member connected axially to the rotated member and to arrange devices upon the handle member and the rotating member for cooperation to interlock and release the same for turning together in one direction or for the complete release of the handle member.

A still further object of the invention is to provide a flange setter of this type which flange engaging means is adjustable so as to accommodate the device to flanges of different sizes, and which admits of quick and easy and accurate adjustments.

The invention also contemplates a structure possessing all of the above outlined characteristics, and which at the same time may be easily and economically manufactured and handled.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a flange setter constructed according to the present invention.

Figure 2 is an edge elevation of the same.

Figure 3 is an enlarged fragmentary sectional view taken lengthwise through one of the pawl housings, showing the adjustably mounted pawl therein, and Figure 4 is an enlarged fragmentary sectional view taken through one of the adjustable screwing devices for engaging the flange of the pipe or the like.

Referring to the drawing, 10 designates a rotatable member in the form of a wheel provided on its periphery with outstanding teeth 11 equi-distantly spaced apart and provided with straight throats, the opposite walls of which are parallel to each other and radial to the member 10. The member 10 is provided with spokes 12 forming a spider to support the rim of the member 10. The spokes 12 have each a series of openings 13 therein with the openings of each series spaced radially upon the spoke 12 a distance equal to the corresponding opening 13 of the other spokes so that the openings 13 of the spokes are arranged in concentric circular rows with respect to the axis of rotation of the member 10. The rotatable member 10 is thus in the form of a wheel and has an axial opening through which a pivot pin 14 extends, the pin 14 being suitably secured to an intermediate portion of a handle member 15.

The handle member 15 is of suitable length to extend across one side of the wheel 10 and beyond diametrically opposite sides of the same. Adjacent to the opposite sides of the wheel 10 the handle member 15 is provided with a pair of boxings or housings 16 shown best in Figure 3. Each housing 16 is provided in its rear wall with a substantially cylindrical opening for slidably and rotatably receiving therethrough the stem 17 of a pawl 18. The pawl 18 is mounted on the inner end of the stem 17 and is of circular cross section and adapted to slide in a correspondingly formed opening in the front wall of the housing 16, which latter opening is in line with the cylindrical opening in the opposite end of the housing 16. A coil spring 19 is carried about the stem 17 in the housing 16 and bears at one end against the outer end of the housing 16 and at its other end against the shoulder formed at the juncture between the stem 17 and the pawl 18. The spring 19 normally urges the pawl 18 inwardly against the teeth 11 of the rotatable member 10.

The stem 17 extends outwardly beyond the casing 16 and is provided with a pin 20 serving as a handle by means of which the pawl 17 may be withdrawn into the casing 16 and turned over into an opposite position, the pin 20, shown in Figure 3, in full lines in one position and in dotted lines in the opposite position.

The casing 16 is provided with a cover plate 21 held in place by screws 22 or the like, and the cover plate extends outwardly beyond the casing 16 to an extent sufficient to overlap the pin 20 and hold the same in adjusted position, as shown in Figures 1 and 2. A handle 23 is carried upon one end of the handle member 15 and may be of suitable length for manipulating the member 15 in turning the same and operating the rotatable member 10.

The rotatable member 10 is provided with a pair of upstanding threaded studs 24 upon which are adjustably threaded nuts 25, and the pins 24 are threaded at their inner ends for detachable and adjustable engagement in the openings 13 of the member 10, so as to space the threaded studs 24 toward and from the center of the member 10, to the desired extent in order that the nuts 25 may overlap the outer marginal edge portion of a flange. In order to hold the threaded studs 24 rigidly in place, lock nuts 26 may be threaded upon their lower ends, or otherwise mounted on the studs 24 to facilitate turning of the studs into and out of place and for binding the same in position on the member 10.

As the studs 24 are disposed in diametrically opposite positions upon the member 10, the intermediate spokes 12 are provided with guiding pins or studs 27, which are adjustably secured in openings 13 of their respective spokes 12 which correspond to the openings in which the studs 24 are secured. The guide pins 27 are adapted to merely bear against the outer marginal edge of the flange to center the same on the wheel or member 10.

After the flange is secured in position upon the rotatable member 10, the pawls 18 are adjusted to dispose their inclined faces 28 in one direction, such as shown in Figure 1, to impart a clockwise movement to the rotatable member 10 upon the reciprocation of the handle 23. When it is desired to operate the member 10 in a counter-clockwise direction, it is only necessary to adjust the pawls 18 into a reverse position, as shown in dotted lines in Figure 3 when the inclined faces of the pawls are turned over into an opposite position.

Should it be desired to lock the handle member 15 with its handle 23 rigidly to the rotatable member 10, it is only necessary to reverse the position of one of the pawls 18, so that they lock against the teeth 11 in opposite directions and thus prevent any ratchet movement of the teeth 11 against the pawls 18.

It is apparent that the device is of very simple construction and capable of quick and easy adjustment, the extension of the cover plates 21 serving to hold the pins 20 in adjusted position so that the pawls cannot be accidentally thrown out of adjustment incident to the handling or operation of the device.

It is obvious that various changes and modifications may be made in the details of construction and design of the above specifically described embodiment of this invention without departing from the spirit thereof, such changes and modifications being restricted only by the scope of the following claims.

What is claimed is:—

1. A flange setter comprising a wheel, adjustable centering means mounted on the wheel for engaging a pipe flange, means carried by the wheel for binding the pipe flange thereto, a handle member axially pivoted to the wheel, and independently adjustable pawls carried by the handle member for interlocking engagement with the wheel for rotating the same in opposite directions upon the reciprocation of the handle member.

2. A flange setter comprising a toothed wheel, means for adjustably securing a pipe flange to one face of the wheel, a handle member pivoted coaxially to the wheel at the opposite face thereof, a pair of pawls mounted upon the handle member at diametrically opposed sides of the wheel, said wheel having straight sided teeth for engagement with the pawls, and means connected to each pawl and operable independently one of the other to reverse the pawls for cooperation to turn the wheel in the desired direction, or for operation of the pawls one against the other to lock the wheel to the handle member.

3. A flange setter comprising a handle member, a toothed wheel pivotally mounted on the handle member immediate the ends thereof, said wheel being provided with a plurality of fixed bolt openings arranged to register with correspondingly spaced openings in standard flanges, clamping bolts in the bolt openings for adjustably securing a pipe flange to one face of the wheel, a pair of pawls mounted upon the handle member at either side of the wheel and disposed opposite each other diametrically of the wheel, said wheel having straight sided teeth for engagement with the pawls and means connected to each pawl and operated independently of each other to reverse the pawls for cooperation to turn the wheel in the desired direction and for operation of the pawls one against the other to lock the wheel to the handle member.

In testimony whereof I affix my signature.

HENRY N. LONG.